United States Patent [19]
Basehore et al.

[11] Patent Number: 5,278,945
[45] Date of Patent: Jan. 11, 1994

[54] NEURAL PROCESSOR APPARATUS

[75] Inventors: Paul M. Basehore, Sanford; Albert A. Petrick, Jr.; David Ratti, both of Orlando, all of Fla.

[73] Assignee: American Neuralogical, Inc., Sanford, Fla.

[21] Appl. No.: 819,293

[22] Filed: Jan. 10, 1992

[51] Int. Cl.$^5$ .............................................. G06F 15/18
[52] U.S. Cl. ...................................... 395/27; 395/24; 395/25
[58] Field of Search .............................. 395/24, 25, 27

[56] References Cited
U.S. PATENT DOCUMENTS

| | | | |
|---|---|---|---|
| 5,008,833 | 4/1991 | Agranat et al. | 395/25 |
| 5,065,339 | 11/1991 | Vassiliadis et al. | 395/24 |
| 5,091,864 | 2/1992 | Baji et al. | 395/27 |
| 5,131,072 | 7/1992 | Yoshizawa et al. | 395/24 |
| 5,146,420 | 9/1992 | Vassiliadis et al. | 395/27 |
| 5,165,009 | 11/1992 | Watanabe et al. | 395/27 |
| 5,165,010 | 11/1992 | Masuda et al. | 395/27 |

OTHER PUBLICATIONS

Yestrebsky et al., "Neural Bit-Slice Coputing Element", IEEE, Southcon/90, Orlando, Fla., Mar. 20-22, 1990 Conference Record, Session 16: Applications of Artificial Neural Networks, pp. 378-383.

Primary Examiner—Michael R. Fleming
Assistant Examiner—Tarig R. Hafiz
Attorney, Agent, or Firm—Cushman, Darby & Cushman

[57] ABSTRACT

A neural processor apparatus implements a neural network at a low cost and with high efficiency by simultaneously processing a plurality of neurons using the same synaptic inputs. Weight data is sequentially accessed from an external weight RAM memory to minimize space on the IC. The input data and weight data may be configured as either a single, high-resolution input or a plurality of inputs having a lower resolution, whereby the plurality of inputs are processed simultaneously. A dynamic approximation method is implemented using a minimal amount of circuitry to provide high-resolution transformations in accordance with the transfer function of a given neuron model. The neural processor apparatus may be used to implement an entire neural network, or may be implemented using a plurality of devices, each device implementing a predetermined number of neural layers.

11 Claims, 9 Drawing Sheets

NEURAL PROCESSOR APPARATUS

BACKGROUND OF THE INVENTION

1. Field of The Invention

The present invention relates to hardware implementations of real-time neural network systems.

2. Description of the Related Art

Neural network models have been developed in an effort to achieve improved performance in areas such as pattern recognition, classification and image processing. These neural networks, which follow the pattern of biological neural nets, include a plurality of neural layers each having a plurality of neurons. Each of the neurons within a neural layer outputs a response to a weighted sum of inputs. Specifically, a neuron will receive a plurality of inputs, amplify or decrease each input by a corresponding weight, and output a value in accordance with the transfer function of the neuron operating on the weighted sum of inputs. In contrast to microprocessor-based systems which are limited by their von Neumann and sequential architecture, a neural network can perform a variety of non-linear computations at relatively high speeds due to its relatively large degree of parallelism and connectivity.

Despite the appeal of neural networks and their highly-parallel architecture, few low-cost hardware implementations exist for the neural networks because of their inherent requirements, namely a high degree of connectivity and accurate, high-resolution neural response characterizations. One implementation of the neural network executes the neural network using a software-based system. Thus, since the neural network is emulated in software, the hardware implementation still relies upon a microprocessor-based system using a central processing unit having a von Neumann architecture. Thus, the software emulator of the neural network is subject to the limitations of the microprocessor which maintains a von Neumann architecture, thus resulting in a slower speed.

Further limitations in the implementation of neural networks are caused by the high cost of implementing such a highly-connective neural network in hardware. Any attempt to implement a neural network on a semiconductor chip greatly increases the area of the IC, thereby increasing not only the processing time but also the cost to manufacture the integrated circuit. Further, a neural network implemented in hardware becomes less flexible to the learning which is required before any pattern recognition by the neural network can be effective.

A final difficulty with conventional hardware-based neural networks is that if a digital implementation is preferred for greater efficiency, the flexibility in implementing accurate neural response characteristics is limited. For example, it may be desirable that a neuron has a sigmoidal response to the weighted sum of inputs. However, any desire to improve the accuracy of the sigmoidal response function necessitates a higher number of digital bits to represent the digital number, thereby increasing the complexity and the cost of the hardware-based neural network.

It would be desirable to provide an apparatus which provides maximum flexibility for constructing diverse neural networks. It would also be desirable to provide fast network processing times and to minimize the cost of the IC chip by reducing the area of the die.

Further, it would be desirable to provide an apparatus which implements a neural network while enabling flexible learning of the neural network as well as fast, efficient data transfer into the neural network.

Finally, it would be desirable to provide an apparatus which performs complex neuron response functions with high resolution and which is implemented economically.

SUMMARY OF THE INVENTION

It is an object of the present invention to provide a hardware-based apparatus which implements a neural network at a low cost and with high efficiency.

It is a further object of the present invention to provide an apparatus which economically implements neural networks with simultaneous processing of a plurality of neurons.

It is a further object of the present invention to provide a low-cost apparatus which enables high-resolution neural responses.

It is a further object of the present invention to provide an apparatus which implements a neural network which can be easily trained and modified by learning functions.

In order to achieve these and other objects, the present invention provides a neural processor apparatus with maximum flexibility for implementing large and diverse neural networks with high resolution and low cost. The neural processor of the present invention implements a plurality of neurons of a neural network by effectively providing simultaneous processing of at least one input for a plurality of neurons. Specifically, the neural processor receives input data for the plurality of neurons. The input data may be configured as multiple neural inputs which make up synaptic inputs for a neuron or as a single high-resolution neural input. The neural processor also receives synaptic connection weights for the respective neurons, also known as the weight data, from an external weight RAM via a dedicated external RAM bus. The neural processor includes a processing element which processes the input data for the plurality of neurons in accordance with the corresponding weight data. After the processing element has processed all the synaptic inputs for the neurons, the processing element outputs dot products for each of the neurons, which represent the weighted sum of inputs for the corresponding neurons. The processing element is then able to process additional input data for a different set of neurons.

The neural processor also includes a dot product transform circuit for transforming the dot products for the neurons to a transformed product in accordance with a predetermined transfer function. The transformed products are output to an output register, which enables the transformed products to be read from the neural processor either in a time-division multiplexed parallel format. The transformed products can also be input back to the processing element, so that the neural processor can implement a plurality of neural layers.

The processing element uses a time-division-multiplex type system to simultaneously process a plurality of neurons in a cost effective manner. The input data can be configured to represent a different number of neural inputs, for example, as sixteen 1-bit inputs, four 4-bit inputs, two eight-bit inputs or one sixteen-bit input. The input data is simultaneously processed in a dot product generator with weight data for one of the neurons and the result is stored in a corresponding accumulator of an accumulator array. The same input data is then simultaneously processed in the dot product generator with weight data for another of the neurons and the result is stored in another accumulator of the accumulator array. Thus, the input data is successively processed with the weight data of corresponding neurons and the results are stored in the respective accumulators of the neurons, so that each accumulator of the accumulator array stores the weighted input of a corresponding neuron. After the input data is processed with the weight data and stored in the corresponding accumulator for all the neurons currently being processed by the processing element, a different input cycle is begun for the same neurons.

The processing element continues repeating the input cycle for all inputs of the neurons being implemented by the accumulators. The processing element then outputs the dot products for each of the neurons being implemented by the processing element to the dot product transform circuit. Thus, the processing element processes input data in one input cycle for a plurality of neurons having corresponding weight data by successively processing the same input data with successive weight data for the respective neurons. Thus, all the weight data and input data for all neurons are multiplexed onto two dedicated signal paths. As a result, the number of input lines for the IC, and consequently the IC size, is minimized with no loss of performance. Thus, the reduced size of the IC provides substantial cost savings.

The dot product transform circuit transforms each of the dot products to a transformed dot product according to a predetermined neural function. The predetermined neural function, which is the same for all the neurons currently being processed, may be either a linear response or, for example, a nonlinear or sigmoidal response.

The dot product transform circuit provides an effective arrangement for transforming the dot product with up to a sixteen-bit resolution in a fast, economical manner without the necessity of a 64k look-up table (LUT). The dot product transform circuit uses a dynamic approximation method whereby the dot product of the neuron is assigned to one of sixteen approximation regions, each region having a point value and a correction factor, also known as a tilt factor. In order to give a higher degree of resolution to the point value, the correction factor is multiplied with the dot product and the result is added to the point value to obtain a transformed product. Thus, while a 64k LUT may be expensive and inconvenient to implement on a single IC, the dot product transform circuit enables a high-resolution transformation using simple, cost-effective circuitry on the IC. As a result, since the area of the die may be reduced, the overall cost and complexity of the IC is reduced.

The features of the present invention will become more readily apparent from the below detailed description and the accompanying drawings.

BRIEF DESCRIPTION OF THE DRAWINGS

Reference is made to the attached drawings, wherein elements having the same reference numeral designations represent like elements throughout, and wherein.

DETAILED DESCRIPTION OF THE PREFERRED EMBODIMENT

The preferred embodiment of the present invention will now be described with respect to the accompanying drawings.

Figure 1:
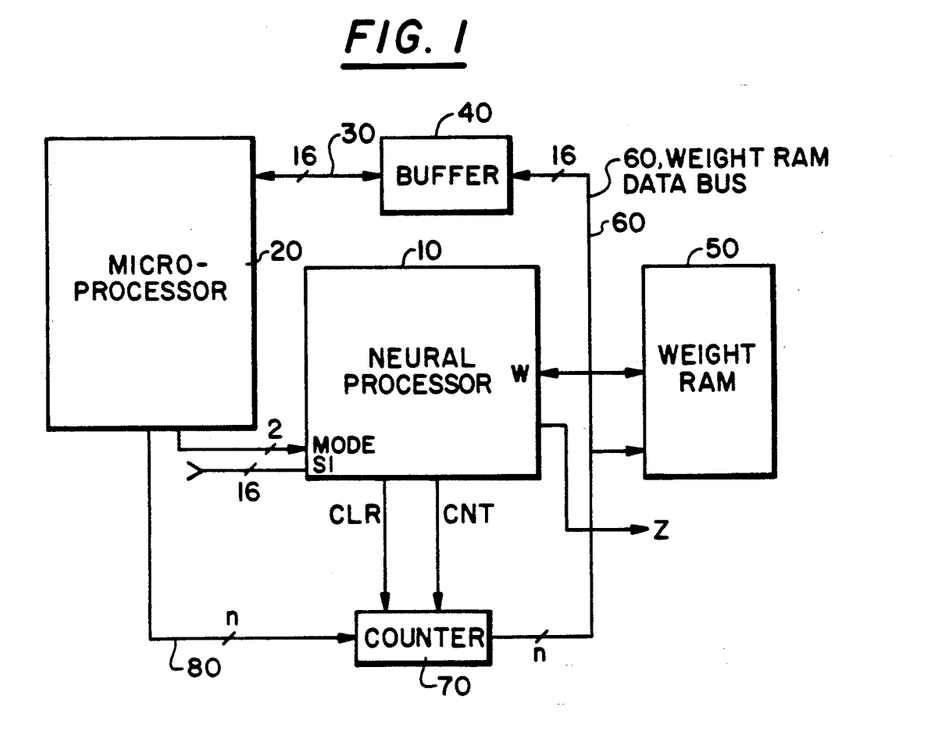
FIG. 1 is a block diagram of an implementation of the neural processor apparatus according to a preferred embodiment of the present invention.

FIG. 1 discloses an implementation of the neural processor apparatus according to a preferred embodiment of the present invention. A neural processor 10 is coupled to a microprocessor 20, which controls all overhead, timing and control functions. For example, the microprocessor 20 controls the initialization of the neural processor 10, and may control functions such as the clocking of data, reset, and controlling the output protocol of the neural processor 10. In addition, the microprocessor 20 outputs a two-bit mode signal (MODE), which defines the bit-length of the input data (SI). Other necessary control functions of the microprocessor 20 will become apparent to those skilled in the art in view of the description below.

The microprocessor 20 outputs data onto a 16-bit data bus 30 to a buffer 40. The buffer 40 is coupled to a weight RAM 50 via a weight RAM data bus 60. The weight RAM 50 stores the synaptic connection weights for the neurons to be implemented in the neural processor 10. Since the weight data is stored in the external weight RAM 50, the IC size of the neural processor 10 can be minimized, with data transfer between the weight RAM 50 and the neural processor 10 taking place over the dedicated weight RAM data bus 60.

The weight RAM 50 is addressed by an external RAM address counter 70 which stores an n-bit address loaded from an address bus 80. As described in detail below, the neural processor 10 outputs an address clear signal (CLR) to the counter 70 in order to load the n-bit address from the address bus 80 into the counter 70. The n-bit address is incremented in response to a count signal (CNT) from the neural processor 10. As a result, the incremented address is output from the counter 70 to the weight RAM 50, with the addressed data being output from the weight RAM 50 to the neural processor 10 via an input W.

Figure 9:
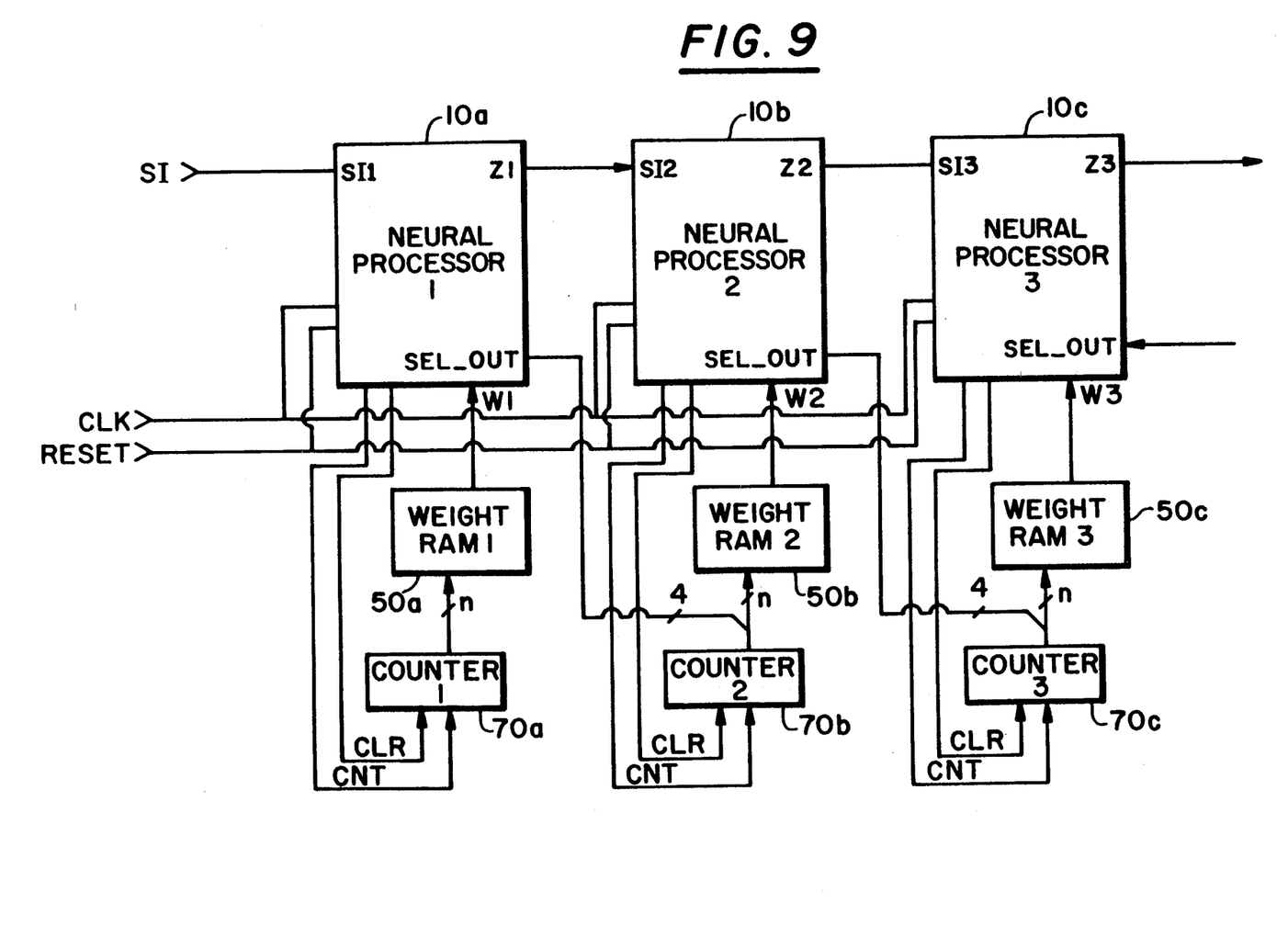
FIG. 9 illustrates an exemplary implementation of a plurality of neural processor devices of the present invention for implementing a neural network.

The neural processor 10 receives a 16-bit synaptic input from, for example, a data source such as sensors, a mass storage device or another neural processor, as shown in FIG. 9 below. The implementation of FIG. 1 can be used for neural processing applications, as well as for learning of the neural network. Those skilled in the art will appreciate that the microprocessor 20 can be used for the training or learning of the neural network model. Alternatively, training or learning of the neural network may be accomplished by an external training processor, using paradigms based upon system application. Since the weight RAM 50 is external to the neural processor 10, the weight data within the weight RAM 50 can easily be manipulated to modify the synaptic connection weights of the neural network model.

Figure 2:
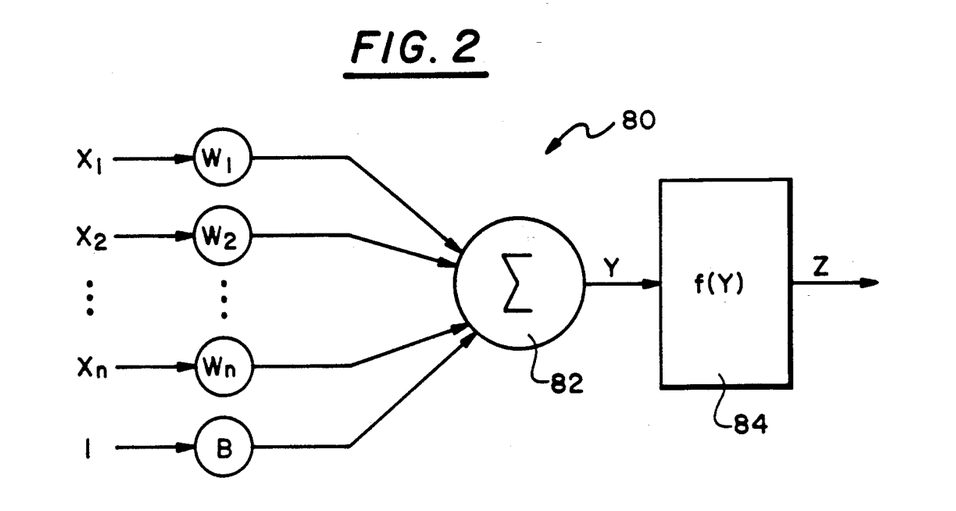
FIG. 2 is a model of a neuron as implemented in the neural processor of the present invention.

FIG. 2 illustrates the basic neuron model implemented in the neural processor apparatus according to the preferred embodiment. The neuron model 80 receives a plurality of inputs ($X_1, X_2, \ldots X_n$), each of which are multiplied by a corresponding synaptic connection weight ($W_1, W_2, \ldots W_n$). The weighted sum of inputs are added to a summation portion 82 with a bias level (B). The summation circuit 82 outputs the biased weighted sum of inputs as a summation value (Y). The summation value (Y) is input to a transform circuit 84 which outputs a value (Z) according to a transfer function f(Y). Thus, the neuron model 80 outputs a transformed product (Z) according to the equation:

$$Z = f\left(\sum_{i=1}^{n} X_i \cdot W_i + B\right) \quad (1)$$

Figure 3:
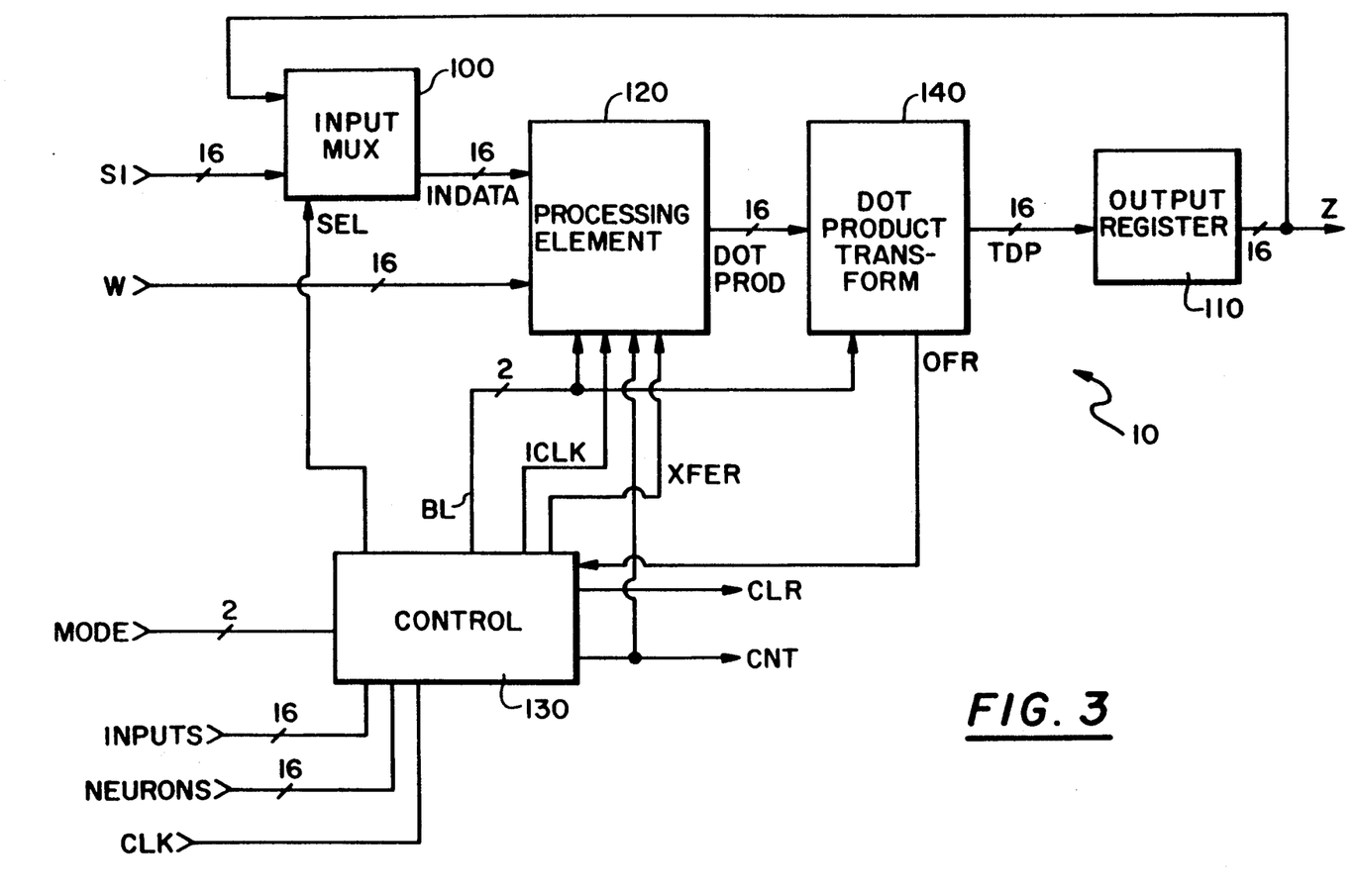
FIG. 3 is a block diagram of the neural processor apparatus of FIG. 1 according to the preferred embodiment of the present invention.

FIG. 3 is a block diagram of the neural processor 10 according to a preferred embodiment of the present invention. As shown in FIG. 3, the neural processor 10 includes an input multiplexer 100 which receives the 16-bit synaptic input data (SI) from the external data source. The input multiplexer 100 also receives a 16-bit transformed product (Z) from an output register 110. The input multiplexer 100 outputs one of the two input signals as input data to be processed (INDATA) to a processing element 120 in response to a select signal (SEL) from a control circuit 130. Thus, the neural processor 10 can implement an entire neural network one layer at a time by feeding back the results of one layer (Z) from the output register 110 to the input multiplexer 100 for processing by the processing element 120. Alternatively, the neural processor 10 can operate as a single neural layer by continuously selecting the synaptic input data (SI) from the external device.

The processing element 120 receives the 16-bit input data to be processed (INDATA) and the 16-bit weight data (W). As described in detail below, the processing element 120 applies the input data (INDATA) successively to a plurality of neurons each of which have their corresponding synaptic connection weights input via the 16-bit weight data input (W). The input data (INDATA) is latched by the processing element 120 in response to an input cycle clock signal (ICLK) from the control circuit 130. Similarly, the weight data for a corresponding neuron is latched by the processing element 120 in response to a count signal (CNT) from the control circuit 130. The timing of the control circuit is arranged so that a plurality of count signals (CNT) will be output for every input cycle clock signal (ICLK). Thus, for a given input, the processing element 120 will access the weight data for a plurality of neurons, for example, 16 neurons, thereby applying the input data (INDATA) to each of the 16 neurons being processed by the processing element 120. This interval of applying the input data (INDATA) to each of the 16 neurons is defined as one input cycle.

After the input data (INDATA) has been applied to the 16 neurons currently being processed by the processing element 120, the control circuit 130 initiates another input cycle by outputting another input cycle clock signal (ICLK) to the processing element 120, which latches new input data on the INDATA bus. Thus, the neurons currently being processed by the processing element 120 receive additional input data.

The input cycles are repeated by the processing element 120 until all of the inputs ($X_1, X_2, \ldots X_n$) have been processed by the processing element 120. After all the inputs for the neurons have been processed, the control circuit 130 outputs a transfer command (XFER) to the processing element 120, which sequentially outputs the dot products for each of the neurons (DOT PROD) to the dot product transform circuit 140. The dot products output by the processing element 120 (DOT PROD) correspond to the output signal (Y) from the summation circuit 82 in FIG. 2. The dot product transform circuit 140 performs a transformation of the dot products of each of the neurons to a transformed dot product (TDP) and outputs the results to the output register 110. If an overflow is generated, the TDP value is set at a maximum (or minimum) and an overflow (OFR) flag is output to the control 130. According to the preferred embodiment, the function of the dot product transform circuit 140 corresponds to the transform circuit 84 of FIG. 2, which performs the function f(Y). Also, each of the neurons being processed by the processing element 120 have the same transform function f(Y) in order to optimize processing speed.

The neural network organization of the neural processor 10 is selected by the user application and controlled by the control signals input to the control circuit 130. Specifically, the control circuit 130 receives a mode input (MODE) which identifies whether the synaptic input data (SI) is configured as 16 one-bit inputs, four 4-bit inputs, two 8-bit inputs or one 16-bit input. The control circuit 130 outputs a bit-length command (BL) to the processing element 120 and the dot product transformation circuit 140 to enable processing of the configured input data.

Since the synaptic input data (SI) can be configured to represent a different number of neural inputs, the processing element 120 can operate at a maximum speed by simultaneously processing sixteen 1-bit inputs; it will be readily apparent that the weight data (W) will also be configured to be consistent with the input data, so that if the synaptic input data (SI) represents sixteen 1-bit inputs, then the weight data (W) will represent sixteen 1-bit synaptic connection weights. Alternatively, if the 16-bit input data represents two 8-bit inputs, the weight data will also represent two 8-bit synaptic connection weights, and so on.

If a high level of precision is desired, then the synaptic input (SI) can represent a single 16-bit input, at a sacrifice of speed. However, if processing speed is critical, then the synaptic input data (SI) can be made to represent sixteen 1-bit inputs, thereby providing sixteen times the processing speed.

According to the preferred embodiment, all the neurons implemented by the neural processor 10 receive the same maximum number of inputs. The maximum number of inputs per neuron is supplied to the control circuit 130 via a 16-bit signal path INPUTS and loaded into a first internal counter (not shown). If a neuron is to have a lesser number of inputs, then the corresponding weights are set to zero. The total number of banks of neurons, wherein one bank consists of sixteen neurons, is supplied to the control circuit 130 via a 16-bit NEURONS signal path and loaded into a second internal counter (not shown). The total number of banks of neurons (NEURONS) indicates how many banks of neurons need to be processed by the processing element 120, whereby the processing element 120 can process one bank of sixteen neurons at a time. Further, a system clock (CLK) is supplied to the control circuit 130 to control data transfer timing.

Operation of the control circuit 130 will now be described. The control circuit 130 receives the input configuration data from the MODE input and supplies the data as a bit-length command (BL) to the processing element 120 and the dot product transform circuit 140. The total number of inputs per neuron is loaded from the INPUTS signal path into the first internal counter and the number of banks of neurons is loaded into the second internal counter from the NEURON signal path. During each clock pulse (CLK), the control circuit 130 outputs the count signal (CNT) to the processing element 120 and externally to the counter 70 (see FIG. 1). Referring to FIG. 1, the address stored in the counter 70 is incremented so that the weight RAM 50 outputs the addressed weight data to the neural processor 10 as the weight data (W).

Referring to FIG. 3, the count signal (CNT) causes the processing element 120 to latch the 16-bit weight data (W). Since the processing element 120 processes 16 neurons during one input cycle, the input cycle clock signal (ICLK) is supplied to the processing element 120 for every 16 cycles of the count (CNT) signal count. Each time the input cycle clock signal (ICLK) is output, the first internal counter of the control circuit 130 is decremented, indicating the number of inputs to be processed for the neurons. When the first internal counter decrements to zero, the control circuit 130 outputs the transfer signal (XFER) to the processing element 120. Also, the second internal counter is decremented, indicating that one bank of 16 neurons has been processed. The above process is then repeated for another bank of neurons. The operation by the neural processor 10 is complete when the second internal counter decrements to zero indicating that all the banks of neurons have been processed. When all the banks of neurons have been processed, the control 130 outputs the clear signal (CLR) to the counter 70.

Thus, the neural processor 10 will make N number of accesses to the external weight RAM before clearing the external RAM address counter 70, wherein:

$$N = (i/w + 1) \times (b \times 16) \quad (2)$$

where:
  i = number of synaptic inputs;
  w = number of weights per 16-bit input word (1 for 16-bit mode, 2 for 8-bit mode, 4 for 4-bit mode, or 16 for 1-bit mode);
  b = number of banks of sixteen neurons to be processed by the neural processor 10.

As shown in equation (2), the internal counters of the control circuit 130 are arranged to also supply the bias data from the weight RAM 50 for each neuron as modelled in FIG. 2.

Figure 4:
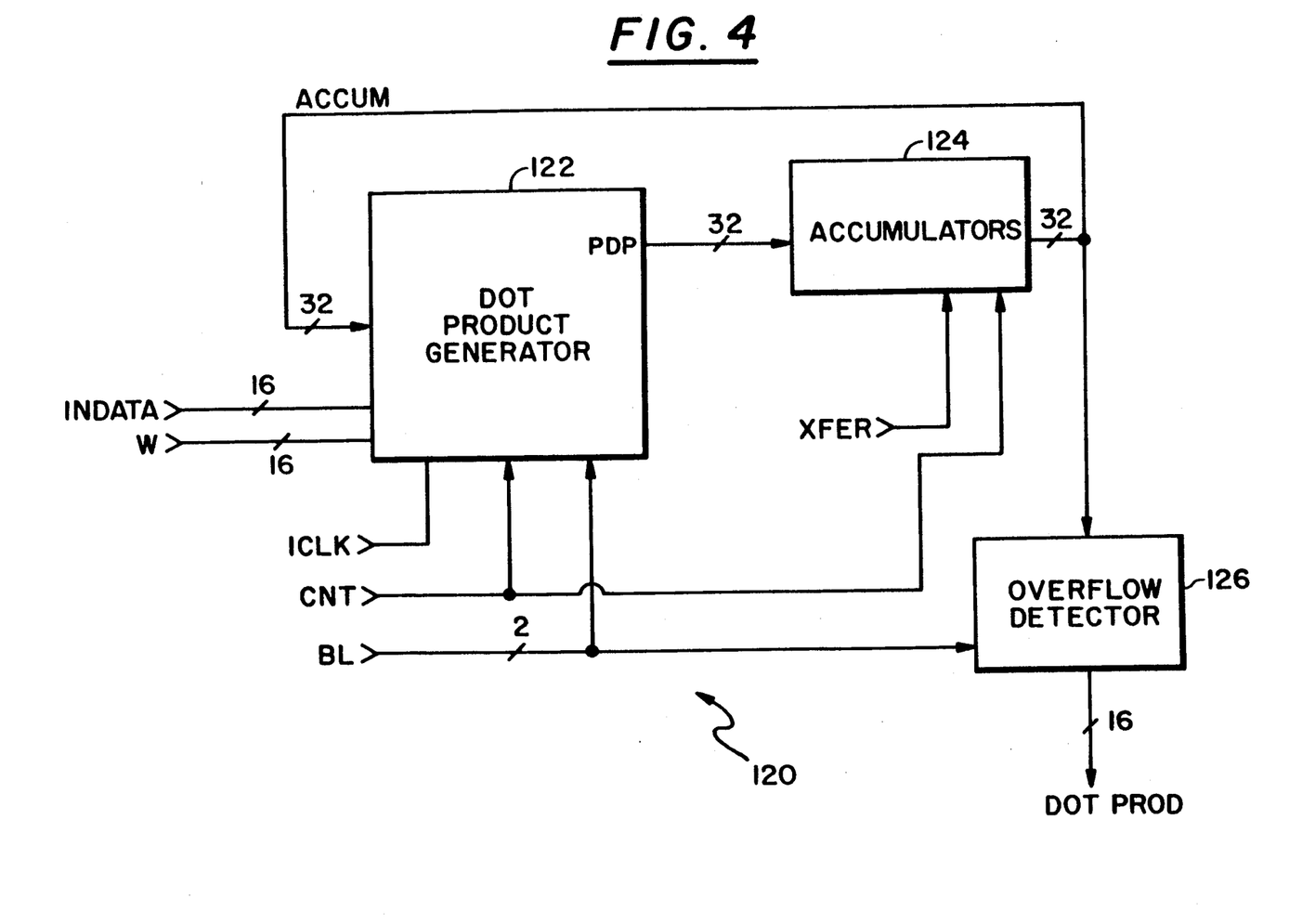
FIG. 4 is a block diagram of the processing element of FIG. 3.

FIG. 4 discloses a block diagram of the processing element 120 shown in FIG. 3. The processing element 120 includes a dot product generator 122, an array of 32-bit accumulators 124 and an overflow detector 126. The dot product generator 122 latches the input data (INDATA) in response to the input cycle clock signal (ICLK) and latches the weight data (W) in response to the count signal (CNT). The dot product generator 122 also receives the bit-length command (BL) from the control circuit 130 (see FIG. 3). The array of accumulators 124 includes sixteen 32-bit accumulator registers for storing partial dot products for each of the sixteen neurons being processed. Thus, each accumulator register of the accumulator array 124 stores the weighted sum of inputs being accumulated for the respective neuron as a 32-bit number. Each accumulator register is sequentially addressed in response to the clock signal (CNT). Whenever an accumulator register of the accumulator array 124 is addressed, the stored accumulated value for the respective neuron is output on the 32-bit signal path (ACCUM) for updating by the dot product generator 122.

After the processing element 120 has processed the neurons for all the inputs, the array of accumulators 124 sequentially output the weighted sum of inputs to the overflow detector 126 in response to the transfer command (XFER) from the control circuit 130.

The overflow detector 126 determines whether the weighted sum of inputs for a corresponding neuron has overflowed the digital range of the bit length in use. If an overflow is detected, the overflow detector 126 outputs a predetermined overflow value as the dot product (DOT PROD) for the corresponding neuron in response to the bit-length command (BL).

It will be realized that during the summation process, the partial dot product may temporarily undergo an overflow, depending on the inputs and the weights. However, as the final inputs are processed, it is assumed that in order to have a stable neural network, the dot product will tend to converge to a stable number within the selected digital range. For example, if the neural processor 10 is operating in an 8-bit mode, it is assumed that the final weighted sum of inputs will also tend to be an 8-bit value. Alternatively, if the neural processor 10 is operating in a 16-bit mode, it is assumed the weighted sum of inputs will equal a 16-bit value. If, however, the weighted sum of inputs exceeds the desired bit-length, the overflow detector 126 sets the overflowed number to a maximum (or minimum negative) digital value in 2's complement format. Thus, in the 16-bit mode, the value for the weighted sum of inputs should be no more than sixteen bits wide; in the 8-bit mode, the accumulator value should be no more than eight bits wide; in the 4-bit mode, the accumulator value should be no more than four bits wide; and in the 1-bit mode, the accumulator value should be no more than sixteen bits wide, since there is no negative arithmetic being performed. In other words, in the 1-bit mode, the 1-bit values are merely accumulated. Therefore, if an overflow is detected, the overflow detector 126 outputs overflow values (hexadecimal) as shown below in Table 1.

TABLE 1

| Mode | Overflow Values Sign | Overflow Value |
|---|---|---|
| 1 and 16-bit | + | 7FFF |
|  | − | 8000 |
| 4-bit | + | 0007 |
|  | − | FFF8 |
| 8-bit | + | 007F |
|  | − | FF80 |

The dot product signal (DOT PROD) output from the overflow detector 126 is in accordance with the bit length command (BL), so that in the 1- and 16-bit mode, the dot product has a value sixteen bits wide; in the 8-bit mode, the dot product has a value eight bits wide; and in the 4-bit mode, the dot product has a value four bits wide. As a result, the overflow detector outputs a dot product signal (DOT PROD) for each neuron being processed which represents the weighted sum of inputs for the respective neuron.

Figure 5:
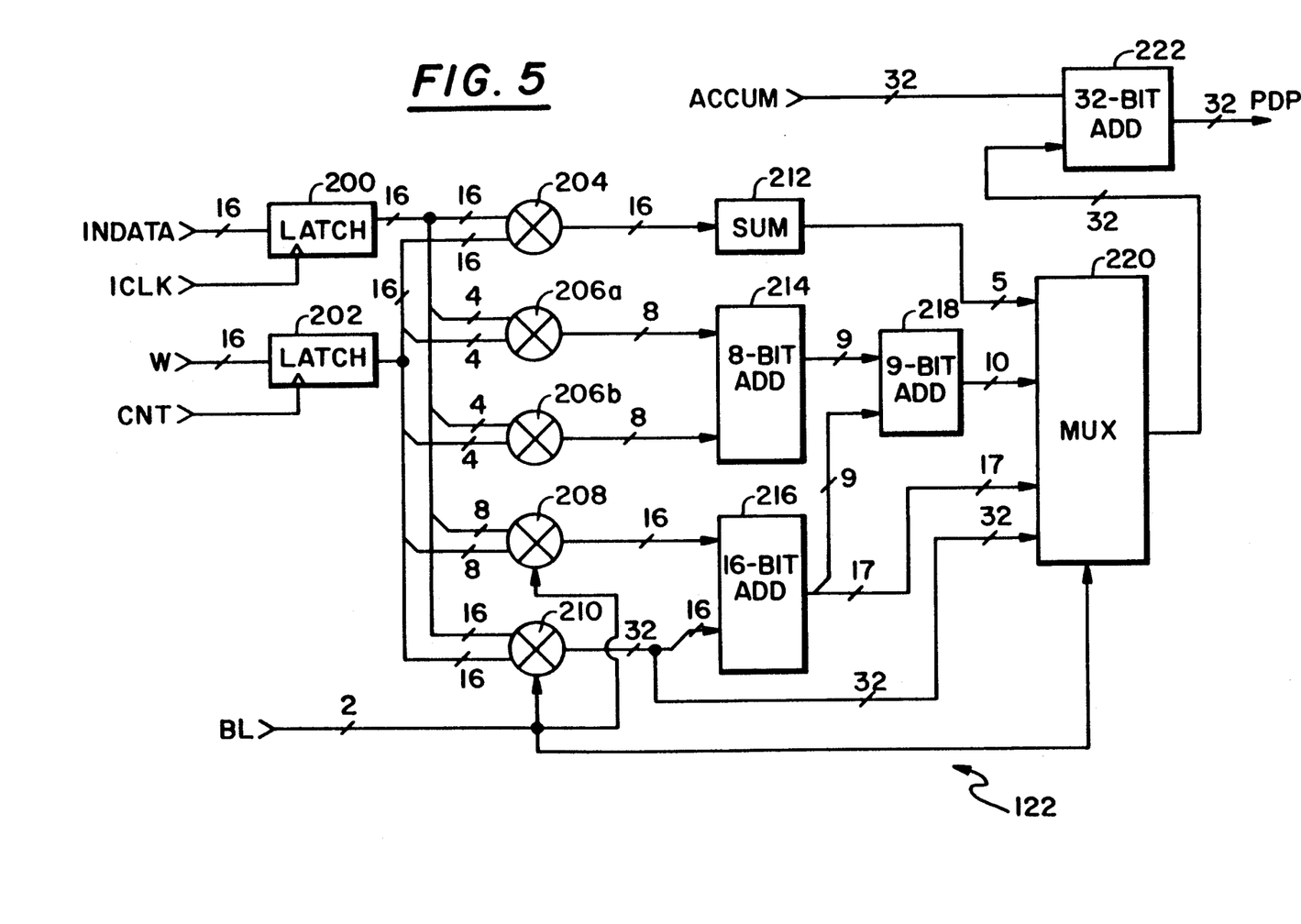
FIG. 5 is a block diagram of the dot product generator of FIG. 4.

FIG. 5 is a block diagram of the dot product generator 122 of FIG. 4. The dot product generator 122 includes a latch 200 for latching the 16-bit synaptic input data (INDATA) in response to the input cycle clock signal (ICLK). Similarly, the weight data (W) is latched by a latch 202 in response to the count signal (CNT). The latched data is output to an array of multipliers 204, 206, 208 and 210, each of which perform 2's complement multiplication. The array of multipliers includes a 1-bit multiplier array 204 which includes sixteen 1-bit multipliers (AND gates) for simultaneous multiplication of the input data (INDATA) and the weight data (W). The 1-bit multiplier array 204 outputs the sixteen multiplied values to a summation circuit 212, which outputs a 5-bit summation result.

The input data (INDATA) and the weight data (W) are also input to the 4-bit multipliers 206a and 206b, an 8-bit multiplier 208, and a 16-bit multiplier 210. In addition, the 16-bit multiplier 210 can be configured to operate in the 8-bit and 4-bit mode, and the 8-bit multiplier 208 can be configured to operate in the 4-bit mode in response to the bit length command (BL). Thus, the multiplier array including the multipliers 204, 206, 208 and 210 are capable of sixteen simultaneous multiplications in the 1-bit mode, four simultaneous multiplications in the 4-bit mode, two simultaneous multiplications in the 8-bit mode, and one single multiplication in the 16-bit mode.

The input lines to the multipliers are configured, for example, so that the 4-bit multiplier 206a receives bits 0-3 of the 16-bit data, the 4-bit multiplier 206b receives bits 8-11 of the 16-bit data, and the 8-bit multiplier 208 receives bits 0-7 of the 16-bit data. As a result, in the 4-bit mode, the 4-bit multiplier 206a multiplies bits 0-3 of the input data and the weight data; the 4-bit multiplier 206b multiplies bits 8-11 of the input data and weight data; the 8-bit multiplier multiplies bits 4-7 of the input data and weight data; and the 16-bit multiplier 210 multiplies bits 12-15 of the input data and weight data.

The 4-bit multipliers 206a and 206b output the multiplied results to an 8-bit adder 214. Similarly, in the 4-bit mode, the 8-bit multiplier 208 and the 16-bit multiplier 210 output their respective 8-bits of the multiplied results to a 16-bit adder 216. Both the 8-bit adder 214 and the 16-bit adder 216 perform 2's complement addition. When the multipliers 208 and 210 are operated in the 4-bit mode, the 16-bit adder 216 will only have nine bits of meaningful data; as a result, those nine bits are input to a 9-bit adder 218, which also receives the 9-bit output result from the 8-bit adder 214. The 9-bit adder performs 2's complement addition and outputs the 10-bit result to a multiplexer 220.

When the multipliers 208 and 210 are operated in the 8-bit mode, both multipliers output their respective 16-bit results to the 16-bit adder 216, which outputs the 17-bit result to the multiplexer 220. When the 16-bit multiplier 210 is operated in the 16-bit mode, then the 32-bit multiplication result is output directly to the multiplexer 220.

The multiplexer 220 outputs the summation of multiplied products as a partial dot product to a 32-bit adder 222. Since the multiplexer 220 is responsive to the bit length command (BL), the multiplexer 220 outputs the 5-bit partial dot product, the 10-bit partial dot product, the 17-bit partial dot product, and the 32-bit partial dot product in the 1-bit mode, the 4-bit mode, the 8-bit mode, and the 32-bit mode, respectively.

The 32-bit adder 222 adds the partial dot product from the multiplexer 220 to the value previously stored in the addressed accumulator (ACCUM) for the selected neuron. The 32-bit adder 222 performs 2's complement addition and outputs the accumulated result (PDP) to the addressed accumulator for the selected neuron.

Thus, the dot product generator 122 simultaneously multiplies the synaptic input data (INDATA) and the corresponding weight data (W) in accordance with the bit length command (BL), and accumulates the partial dot products for a selected neuron corresponding to one of the sixteen accumulators in the accumulator array 124. If a user decides that a high resolution is necessary, the dot product generator 122 can operate in the 16-bit mode. However, the processing speed is twice as fast in the 8-bit mode, four times as fast in the 4-bit mode, and sixteen times as fast in the 16-bit mode. Therefore, a user may select between the amount of resolution required and the speed desired based upon the simultaneous processing capabilities of the dot product generator.

Further, the time-division multiplexing features of the processing element 120 become readily apparent in view of the foregoing. Specifically, during one input cycle, the user will perceive that sixteen neurons are being simultaneously processed with the same data, while the weight data is being sequentially accessed for each neuron.

It will be readily appreciated that the cost of the IC in fabrication is minimized by reducing the size of the IC to a minimum. Consequently, since all the neuron data is input to the neural processor 10 by the synaptic input (SI) and the weight data input (W) paths, the number of data input pins is minimized. Although a sequential access of weight data is necessary for each neuron being processed, any attempt to increase the number of inputs for a parallel system would increase the number of contact pins for the IC, thereby substantially increasing the cost and size of the IC. Thus, the time-division multiplexing of the synaptic input data and the weight data provides the optimal performance at a minimum cost.

Figure 6:
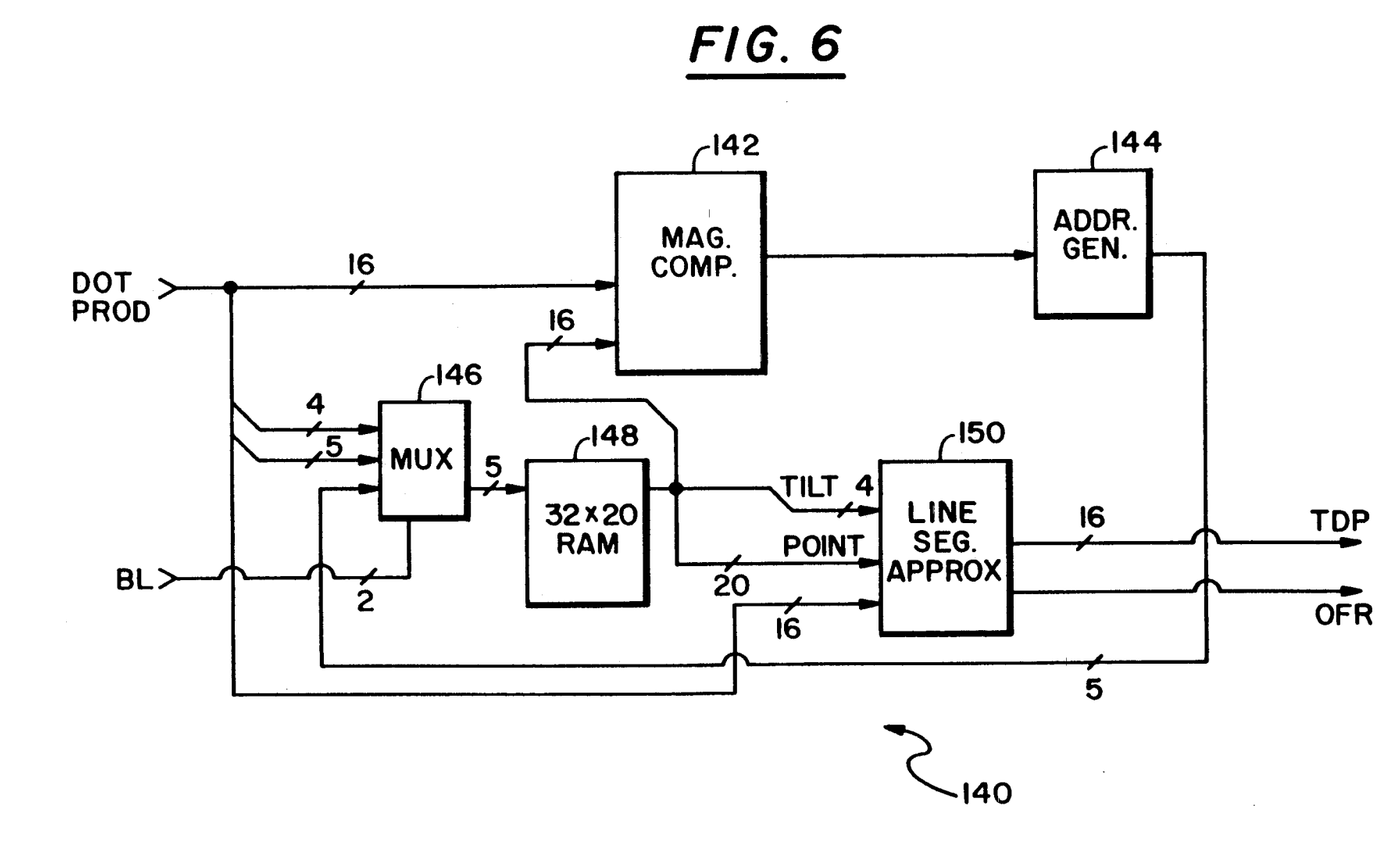
FIG. 6 is a block diagram of the dot product transform circuit of FIG. 3.

FIG. 6 discloses a block diagram of the dot product transform circuit 140 shown in FIG. 3. As indicated earlier, the dot product transform circuit 140 performs a transformation of the dot products of each of the neurons output from the processing element 120 to a transformed dot product (TDP), and corresponds to the transform circuit 84 of FIG. 2, which performs the function f(Y). Thus, each of the neurons being processed by the processing element 120 have the same transform function f(Y) in order to optimize processing speed.

Conventional digital systems used look-up tables (LUT) to map a digital value to an output value in accordance with a predetermined function. However, the size of the LUT increases exponentially with the size of the digital word being processed. Thus, while a 4-bit word requires only a 16×4 RAM as a look-up table, a 16-bit word would require a 64k×16 LUT to map the digital word. Thus, the size and complexity of the 64k LUT dramatically increases the size and cost of the IC which contains the LUT.

According to the preferred embodiment of the present invention, a dynamic approximation method is used to obtain a transformed product having approximately the same 16-bit resolution for a 16-bit input value, without the necessity of the 64k LUT. Specifically, the dynamic approximation method includes the step of assigning the dot product of the neuron to one of sixteen approximation regions on the basis of a binary search. Although the sixteen approximation regions can be evenly distributed, the approximation regions may be unevenly distributed, depending on the nature of the transformation function f(Y). Table 2 shows an example of sixteen approximation regions (decimal), wherein each region has an associated address.

TABLE 2

| APPROXIMATION REGIONS | |
|---|---|
| Address | Region (Decimal) |
| 0 | 0 |
| 1 | 15 |
| 2 | 25 |
| 3 | 35 |
| 4 | 40 |
| 5 | 45 |
| 6 | 49 |
| 7 | 53 |
| 8 | 56 |
| 9 | 59 |
| 10 | 61 |
| 11 | 63 |
| 12 | 65 |
| 13 | 67 |
| 14 | 70 |
| 15 | 75 |
| 16 | 85 |

As shown above in Table 2, assuming an input range from zero to one hundred (decimal), the input value may be assigned to one of sixteen approximation regions, with a higher degree of resolution present in the range of values from 40–70, which correspond to address values "4" to "14", respectively. An exemplary input would be subject to the binary search by comparing the input value with the middle approximation region, for example, the region at address "7" having a value Region=53. If the input value is greater than the input region "7" having a value Region=53, then the input value would next be compared with region "12" having a value Region=65. If the input value was less than region 12, then the input value would then be compared with, for example, region "9" having a value Region=59, and so on.

The binary search process of the dynamic approximation method is embodied in the dot product transform circuit 140 as shown in FIG. 6. Specifically, the dot product transform circuit includes a magnitude comparator 142, an address generator 144, a multiplexer 146, a 32×20-bit RAM 148 and a line segment approximation circuit 150. When the dot product transform circuit is operating in the 4-bit mode or the 8-bit mode, the 32×20-bit RAM 148 is operated as a normal LUT, outputting four and five bits of output data, respectively. In the 4-bit mode, the multiplexer 146 selects the 4-bit dot product input and uses the 4-bit input as an address for the first sixteen locations of the RAM 148. In the 8-bit mode, the multiplexer 146 selects the five most significant bits of the dot product as an address for the thirty-two locations in the RAM 148, which is used as an LUT.

In the 1-bit and the 16-bit mode, the dynamic approximation method is used as described below. Alternatively, the 8-bit mode may also use the dynamic approximation method to improve resolution.

During the dynamic approximation method in the 1-bit and the 16-bit mode, the first sixteen locations of the RAM 148 store the sixteen approximation regions, for example, as shown in Table 2, above. Specifically, each of the first sixteen locations store a 16-bit value of the approximation region and a 4-bit tilt value corresponding to the approximation region (described in detail below). The dot product of the neuron is compared with the selected approximation region in the magnitude comparator 142, which outputs a signal indicating whether the dot product is greater than, less than, or equal to the given approximation region. The address generator 144 has a state machine operating in accordance with the binary search process which outputs a subsequent address in response to the logical data from the magnitude comparator.

After the magnitude comparator 142 indicates that the dot product has been assigned to one of the sixteen approximation regions, the corresponding tilt value is output to a line segment approximation circuit 150, and the address of that approximation region is saved and offset by adding a value of sixteen (decimal) to map the address to the next sixteen memory locations of the RAM 148.

The uppermost sixteen locations of the RAM 148 include a 20-bit point value corresponding to each approximation region. The 20-bit point value serves as a primary output for the threshold of the selected approximation region. The tilt factor provides a correction in view of any difference between the actual value of the dot product and the threshold value of the approximation region. In other words, the tilt factor compensates for any difference between the value of the dot product and the threshold of the approximation region.

Figure 8A:
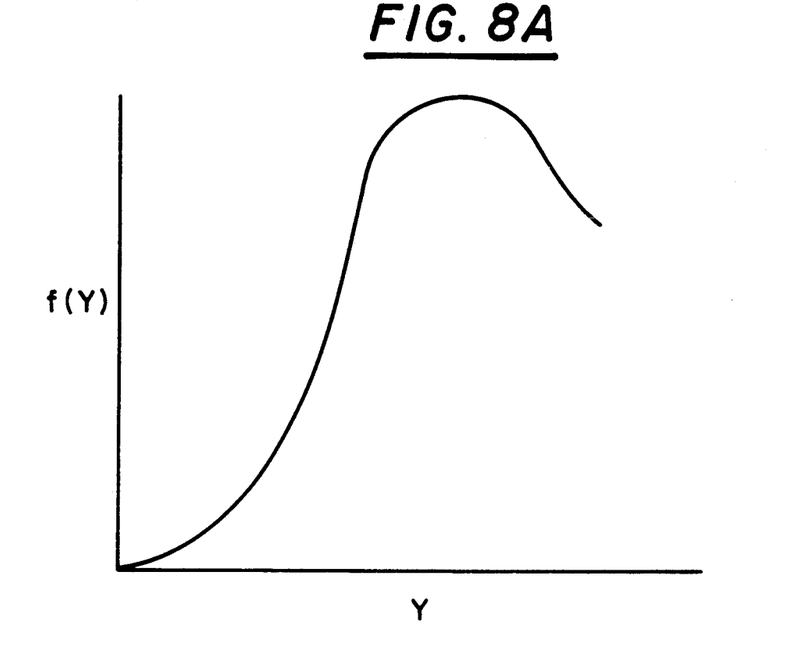
FIG. 8A illustrates the function of the line segment approximation circuit shown in FIG. 7.
Figure 8B:
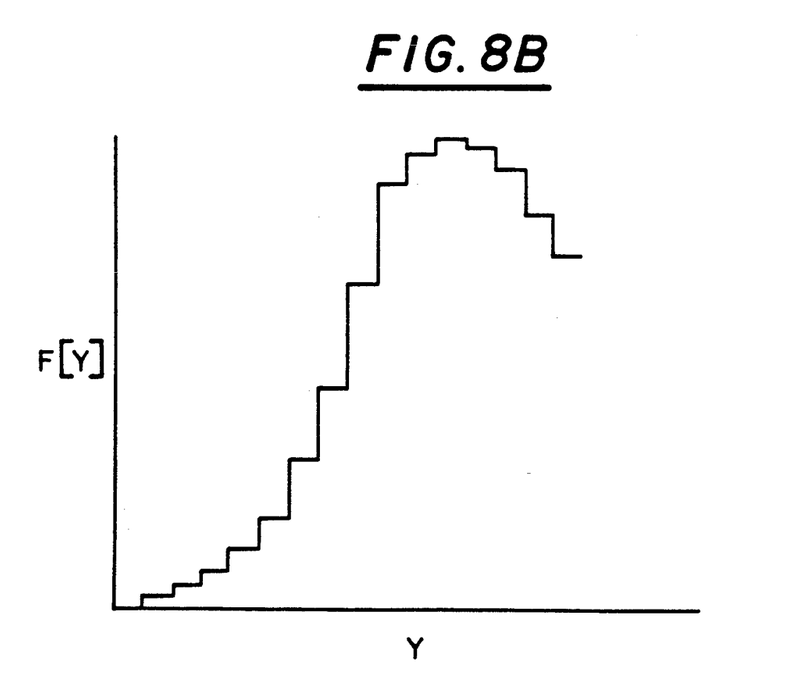
FIG. 8B illustrates the function of the line segment approximation circuit shown in FIG. 7.
Figure 8C:
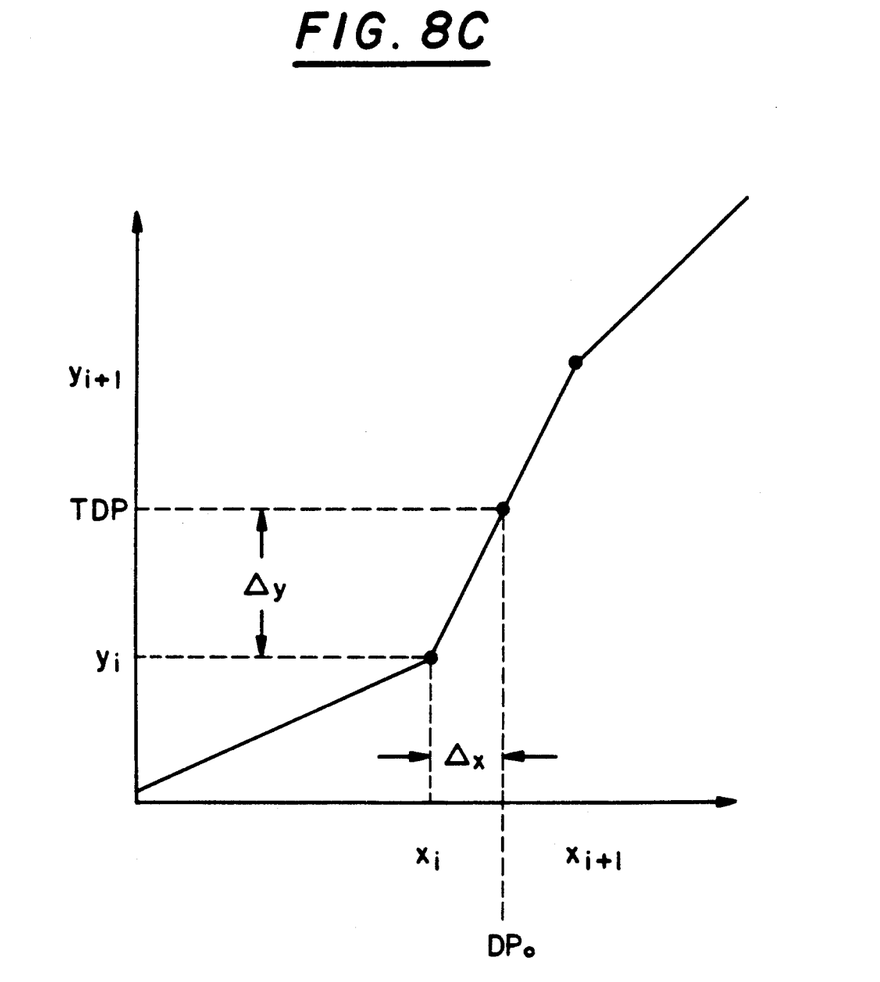
FIG. 8C illustrates the function of the line segment approximation circuit shown in FIG. 7.

The function of the tilt factor will become more readily apparent with reference to FIGS. 8A, 8B, and 8C. FIG. 8A represents an ideal transform function f(Y). However, if the input value were merely mapped to one of sixteen possible values, then the resulting function would resemble the function F[Y] shown in FIG. 8B, which is due to having a limited number of bits of resolution. The tilt factor provides a correction by providing an inherent slope, or tilt, to the difference between the threshold value of the approximation region and the dot product ($DP_0$) value. For example, referring to FIG. 8C, if the transform value is dependent on the threshold of the given approximation region and its associated transfer function value ($x_1$, $y_1$), then the final value of the transformed dot product (TDP) would be:

$$TDP = y_1 + \Delta_y \qquad (3)$$

Further, if the tilt value is defined as $m_1$, the transformed dot product can be obtained by using the equation:

$$TDP = y_i + m_i\Delta_x \qquad (4)$$
$$= y_i + m_i(DP_0 - x_i) \qquad (5)$$

Further, since $x_1$, $y_1$ and $m_1$ are known values, we can define the point value $P_1$ as:

$$P_1 = y_1 - m_1 x_1 \quad (6)$$

By rearranging equations (5) and (6), we obtain:

$$TDP = P_1 + m_1 DP_0 \quad (7)$$

Therefore, by multiplying the tilt factor $m_1$ to the dot product $DP_0$ and adding the result to the point value $P_1$, the transformed dot product may be easily obtained without the necessity for a look-up table.

Referring to FIG. 6, the RAM 148 is addressed as described earlier to output a 20-bit point value ($P_1$) and a 4-bit tilt value ($m_1$) to the line segment approximation circuit 150. The line segment approximation circuit also receives the 16-bit dot product from the processing element 120.

Figure 7:
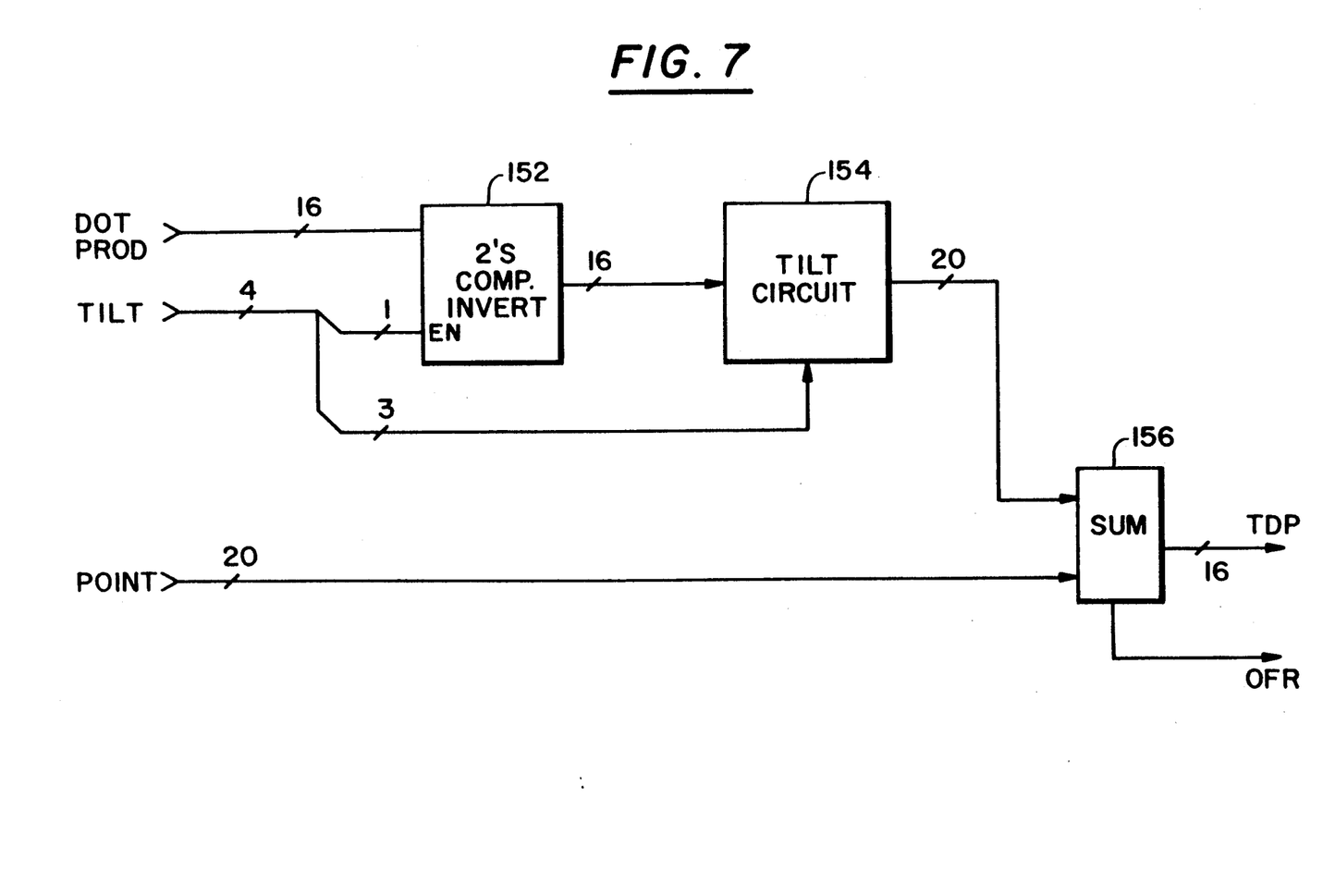
FIG. 7 is a block diagram of the line segment approximation circuit of FIG. 6.

FIG. 7 discloses a block diagram of the line segment approximation circuit 150. In order to obtain approximately 16-bit resolution, the tilt factor uses three bits to define up to eight possible tilt angles (e.g., 0, 1, 2, 4, 8, ½, ¼, ⅛) and one sign bit for positive or negative slope. The sign bit of the tilt value is input to a 2's complement invertor 152. The output of the invertor 152 is supplied to a tilt circuit 154, which multiplies or divides the output from the invertor by shifting the digital value to the left or right in response to the 3-bit slope value of the tilt factor. The shifted value is output from the tilt circuit 154 as a 20-bit value and added to the point value by a summation circuit 156 in order to obtain the transformed dot product (TDP).

The summation circuit 156 includes a 20-bit adder and an overflow detector similar to the overflow detector 126 shown in FIG. 4. The 20-bit adder outputs the result to the overflow detector: if the add result is greater than 16 bits, the overflow detector sets the output TDP as a maximum (or minimum) and sets the overflow flag (OFR).

Thus, the dot product transform circuit 140 enables a transformation of data with nearly 16-bit resolution without the necessity for a look-up table. Although a larger number of clock cycles is required to perform the approximation method than when an LUT is used, the size of the IC is greatly reduced, thereby reducing the cost of the IC.

Referring to FIG. 3, the transformed dot product (TDP) is output from the dot product transform circuit 140 to the output register 110, which outputs the neural product (Z) in the same multiplexed fashion as the synaptic input data (SI). As a result, the output (Z) can either be fed back to the neural processor 10 via the input multiplexer 100, or the data can be output to an external device. Alternatively, the output data (Z) can be output to another neural processor.

FIG. 9 shows an implementation of a plurality of neural processors 10 each of which have a corresponding weight RAM 50 and a counter 70. The neural processors 10 may each be configured to perform either as a single neural layer, or as a plurality of neural layers. In the arrangement shown in FIG. 9, the neural processors 10 each are driven by the same clock and may be reset, for example, by an external processor. Each of the neural processors also has an output select input (SEL—OUT) which commands the output register of the previous neural processor to output one of the sixteen neural results. For example, the counter 70b of the second neural processor 10b has the leastmost significant bits of the counter output being input to the SEL—OUT terminal of the first neural processor 10a so that the first neural processor 10a sequentially outputs the sixteen neural outputs (Z1) as synaptic inputs (SI2) of the second neural processor (10b). It will be readily apparent to those skilled in the art that other control/overhead functions may be desirable in implementing the plurality of neural processors as described above.

The neural processor apparatus of the present invention uses time-division multiplexing to minimize the number of input pins necessary for processing of synaptic and weight data for implementing a neural network. Although the synaptic and weight data are limited to a maximum bit length of sixteen bits, one skilled in the art would appreciate that other bit lengths are available, such as 2-bit, 32-bit, etc. However, the bit length is preferably minimized to reduce the number of pins necessary.

The above embodiment may also be modified by varying the output format, for example, to provide sixteen data streams for the sixteen neurons.

In addition, the neural processor of the present invention processes sixteen neurons at the same time using the same input data for each of the neurons to increase processing speed. One skilled in the art will also appreciate that additional accumulators can be added to process even more neurons using the same input data.

Finally, the dynamic approximation method of the present invention include the steps of assigning the input value to an approximation region and correcting a point value of the approximation region in accordance with the input value and a tilt value of the approximation region to obtain the transformed dot product. The method as applied provides a high-resolution output using a minimum amount of circuitry, thereby reducing the cost of an IC.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A neural processor for implementing a plurality of neurons each having a predetermined number of neural inputs, the neural processor comprising:

means for receiving digital input data and a sequence of weight data, said digital input data having a predetermined synaptic input bit-length and providing data for at least one of said neural inputs, said neural inputs each having a bit-length selectable from a group of predetermined neural bit-lengths, said group including said predetermined synaptic input bit-length as a maximum selectable bit-length;

means for outputting a plurality of dot products corresponding to said plurality of neurons in response to said digital input data and said sequence of weight data, said outputting means comprising:

means for simultaneously multiplying said digital input data and a first weight data from said sequence of weight data in accordance with said selectable bit-length, said first weight data corresponding to at least one of said plurality of neurons, said multiplying means outputting a partial dot product corresponding to said first weight data, and means for accumulating partial dot products for said neurons in response to said input data and said weights from said sequence of said weight data corresponding to said neurons, each of said partial dot products being accumulated with respect to said predetermined number of neural inputs to obtain said plurality of dot products of each of said neurons, respectively; and means for transforming each of said dot products to corresponding transformed products as outputs of said neurons, respectively, in accordance with a predetermined transfer function stored in a memory.

2. A neural processor as recited in claim 1, wherein said simultaneously multiplying means successively multiplies said digital input data with said weight data of each of said respective neurons and outputs said partial dot product of each of said neurons.

3. A neural processor as recited in claim 1, wherein said group of predetermined neural bit-lengths further includes a minimum selectable bit-length, said input data representing said one neural input when said maximum selectable bit-length is selected, said input data representing a maximum group of neural inputs when said minimum selectable bit-length is selected.

4. A neural processor as recited in claim 3, wherein said simultaneously multiplying means comprises:
  first multiplying means for multiplying said first weight data and said one neural input having said maximum selectable bit length and outputting a first multiplied result;
  second multiplying means for simultaneously multiplying each of said neural inputs of said maximum group of neural inputs having said minimum selectable bit-length with corresponding bits of said first weight data having said minimum selectable bit-length and outputting corresponding multiplication results;
  adding means for adding said multiplication results from said second multiplying means and outputting a summation result; and
  means for selecting said first multiplied result or said summation result as said partial dot product in accordance with said selectable bit-length.

5. A neural processor as recited in claim 1, wherein said group of predetermined neural bit-lengths includes a one bit-length, a four bit-length, and eight bit-length and a sixteen bit-length, said input data including, in accordance with said selectable bit-length, one sixteen-bit neural input, two eight-bit neural inputs, four four-bit neural inputs or sixteen one-bit neural inputs.

6. A neural processor as recited in claim 5, wherein said simultaneously multiplying means comprises:
  a first multiplier for simultaneously multiplying each of said sixteen one-bit neural inputs with a corresponding one-bit weight value from said first weight data and outputting multiplication results for said one-bit inputs;
  second and third multipliers for simultaneously multiplying first and second of said four-bit neural inputs with corresponding four-bit weight values from said first weight data, respectively, and outputting first and second multiplication results for said four-bit inputs, respectively;
  a fourth multiplier for simultaneously multiplying, in accordance with said selectable bit-length, one of:
    a third of said four-bit neural inputs with a corresponding four-bit weight value from said first weight data and outputting a third multiplication result for said four-bit inputs, and
    a first of said eight-bit neural inputs with a corresponding eight-bit weight value from said first weight data and outputting a first multiplication result for said eight-bit inputs;
  a fifth multiplier for multiplying, in accordance with said preselected bit-length, one of:
    a fourth of said four-bit neural inputs with a corresponding four-bit weight value from said first weight data and outputting a fourth multiplication result for said four-bit inputs,
    a second of said eight-bit neural inputs with a corresponding eight-bit weight value from said first weight data and outputting a second multiplication result for said eight-bit inputs, and
    said one sixteen-bit neural input with said first weight data and outputting a multiplication result for said sixteen-bit inputs; and
  summing means for summing said multiplication results in accordance with said preselected bit-length to obtain said partial dot product.

7. A neural processor as recited in claim 6, wherein said summing means comprises:
  first adding means for summing said multiplication results for said one-bit inputs and outputting a weighted sum of said one-bit neural inputs;
  second adding means for adding said first and second multiplication results for said four-bit inputs and outputting a first partial weighted sum of said four-bit neural inputs;
  third adding means for adding said third and fourth multiplication results for said four-bit inputs and outputting a second partial weighted sum of said four-bit neural inputs, and for adding said first and second multiplication results for said eight-bit inputs and outputting a weighted sum of said eight-bit neural inputs;
  fourth adding means for adding said first and second partial weighted sums of said four-bit neural inputs and outputting a weighted sum of said four-bit neural inputs; and
  means for selecting one of said weighted sums of said one-bit, four-bit, eight-bit neural inputs and said multiplication result for said sixteen-bit inputs as said partial dot product in accordance with said selectable bit-length.

8. A neural processor as recited in claim 1, wherein said transforming means comprises:
  means for locating each of said dot products within one of a plurality of predetermined regions defining an input range of said predetermined transfer function, each of said regions having a corresponding point value and a tilt value stored in said memory, and
  means for calculating said corresponding transformed product as a sum of said corresponding point value and a multiplied result of said corresponding tilt value and said respective dot product.

9. A neural processor as recited in claim 8, wherein said predetermined regions are nonuniformly distributed in accordance with said predetermined transfer function.

10. A neural processor as recited in claim 1, wherein said transforming means comprises a look-up table memory for storing said transformed products, each of said dot products representing an address signal for said corresponding transformed products stored in said look-up table memory.

11. An approximation circuit for transforming an input value to an approximate transformed value in accordance with a predetermined transfer function, comprising:

a memory circuit for storing a plurality of threshold values for corresponding predetermined regions defining an input range of said predetermined transfer function, said memory circuit storing a corresponding point value and a tilt value for each of said predetermined regions;

means for assigning said input value to one of said predetermined regions by outputting an address signal, said memory outputting said point value and said tilt value of said one predetermined region in response to said address signal; and means for generating the approximate transformed value in response to said output point value and tilt value and said input value, said generating means comprising:

means for multiplying said input value and said tilt value and outputting a correction factor, and a summation circuit for summing said point value and said correction factor and outputting said approximate transformed value.

* * * * *